July 14, 1925.

M. C. OVERMAN

TIRE

Filed May 6, 1922

1,545,790

Inventor
Max Cyrus Overman
By his Attorney

Patented July 14, 1925.

1,545,790

UNITED STATES PATENT OFFICE.

MAX CYRUS OVERMAN, OF NEW YORK, N. Y., ASSIGNOR TO O. & W. COMPANY, A CORPORATION OF NEW YORK.

TIRE.

Application filed May 6, 1922. Serial No. 559,005.

*To all whom it may concern:*

Be it known that I, MAX CYRUS OVERMAN, a citizen of the United States, residing at the city, county, and State of New York, have invented certain new and useful Improvements in Tires, of which the following is a specification.

My present invention relates to improvements in tires including the tires of my copending applications Serial Nos. 500,367 and 500,368 filed September 13, 1921, whereby the clamping of the tire to the rim is facilitated and rendered more secure and whereby the tendency to attrition and wear by the working of the basal portions of the tire on one another is counteracted.

These and other features and advantages of my present invention will appear from an understanding of the following description read in connection with the drawings which purport to show only the preferred embodiment of my improvements although other embodiments are possible within the scope of my invention.

Figure 1:
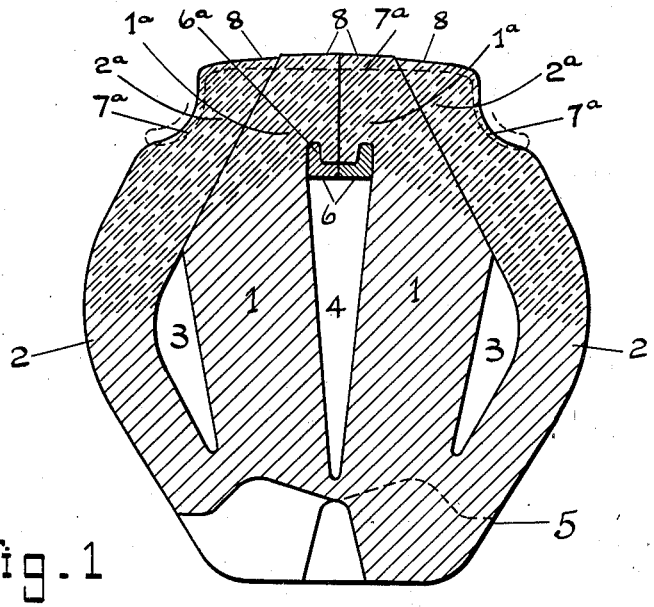
Figure 2:
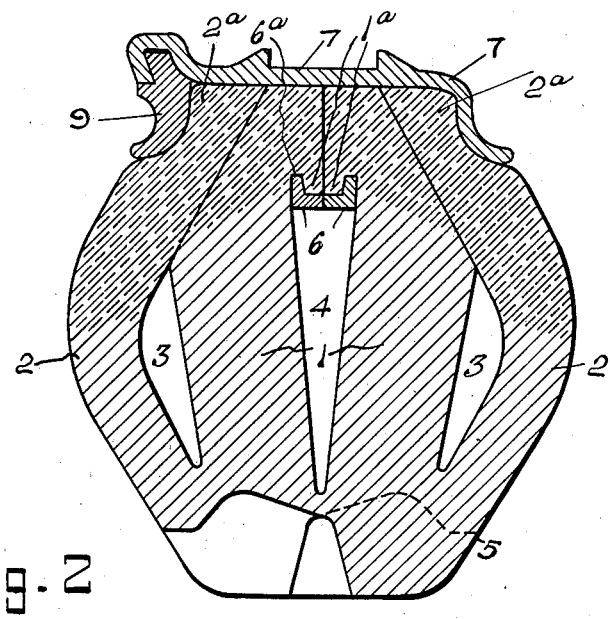

In the drawings, Fig. 1 is a cross-sectional view through my improved tire off the rim; and Fig. 2 is the same shown clamped on a well known form of tire rim.

The expressions of direction such as "upper" and "lower" in the description and claims refer to a section of the tire in ground contact as shown in the drawings. The expression "straight" in the description and claims definitive of the inner members; and "elbow-shaped" definitive of the outer members; and "ends" definitive of the upper and lower portions of said members; and similar expressions, of course refer to said members when looked at or considered in transverse section as in the drawing.

In the illustrated tire within my invention, 1—1 are load-supporting and shock-absorbing inner members; 2—2 are outer members which laterally stabilize and brace the inner members. These members 1 and 2 are relatively closely adjacent and separated by proper spaces, two of which 3—3 are similar in cross section and a third space being designated 4.

The lower ends of all these members are integrally united by a tread portion 5.

The aforesaid load-supporting and shock-absorbing members 1—1 are comparatively tall and thin and in vertical direction are substantially straight and steeply converge toward the tread, the result of their convergence being that the opening 4 in cross-section is substantially V-shaped.

The laterally stabilizing or bracing outer members 2—2 are each elbow-shaped in cross-section, their lower limbs converging toward the tread and their upper or basal limbs toward the rim-engaging portion of the tire. The result is that each of the spaces 3—3 in cross-section is substantially an obtuse-angled triangle with its longest side formed by the side of the adjacent inner member 1.

The respective members 1—1, 2—2 and spaces 3—3 and 4 may be circumferentially continuous around the tire. Also the whole tire is preferably molded as an entirety. The material is, of course, rubber or rubber compound or other suitable rubber-like material, with or without fabric reinforcings and the like.

The upper portions of said inner and outer members when on the rim are adapted to be in side by side contact with their free ends contained in the flange space of the rim, as shown in Fig. 2.

The upper portions of the inner members have clamping portions or ledges $1^a$—$1^a$ which overhang the top of the opening 4 and preferably meet over the center thereof. For clamping these portions $1^a$—$1^a$ to the rim, I use a clamping ring which in effect consists of the ring of my aforesaid applications split into lateral parts 6—6, each a complete ring, one for each inner member of the tire whereby same may be made a part of the clamping portions $1^a$ of said members when the tire is molded.

Each of these rings 6—6 toward its outer edge has a flange $6^a$ directed toward the rim and seated in a complementary recess in the corresponding portion $1^a$ of the tire. The inner edges of the ring 6—6 come together or are adjacent when the tire is on the rim.

The inside diameter of the rings 6—6 is, of course, sufficiently small so that when the tire is on the rim the upper ends of the inner members will be securely clamped between the rings and the rim. At the same time the portions of said inner members that underlie the rim-ends of the outer members 2—2 will securely clamp the latter to the rim and the adjacent flanges.

The advantage of the double over the single clamping ring is that they make it easier to put the tire on the rim.

The full lines in Fig. 1 show the base portions of the tire uncompressed as when the tire is off the rim, whereas the dotted lines 7ª indicate the position of the rim when the tire is on the rim as in Fig. 2.

Said full lines in Fig. 1 show that the upper ends of the inner members are normally longer or higher than the corresponding ends of the outer members. I purposely make them this way so that when the tire is clamped to the rim as in Fig. 2 (compare dotted rim lines 7ª in Fig. 1), said upper ends of the inner members will be more compressed than the corresponding ends of the outer members.

Further, it will be noted that the basal surface 8 of said upper ends when juxtaposed off the rim as in Fig. 1 is transversely convex. This makes it easier to force the tire laterally over a rim of the type shown in Fig. 2, this being a well known standard type of pneumatic tire rim having a solid or non-expansible base ring 7, one of whose flanges is integral therewith and whose other flange is a circumferentially discontinuous flange 9 adapted to be sprung into place in an annular groove provided to receive it on the base ring 7 after the tire has been forced over and upon the base ring.

This transversely convex feature is not so important if the tire rim used be of the radially expansible type shown in my other aforesaid applications; but the feature consisting in the greater height of the upper ends of the inner, as compared with those of the outer members, is important which ever type of rim is used. In either case it causes the tire to be clamped more securely to the rim.

The outer members are not only laterally stabilizing relative to the inner members but they also share with them the driving effort. Unless the outer members are clamped to the rim firmly enough relatively to the firmness with which the inner members are clamped, I have discovered that said outer members do not do their full proportionate share of the driving work. To this end I make the basal width of the tire off the rim not merely equal to the distance between the flanges but materially greater than said distance, as indicated in Fig. 1. Compare the dotted lines 7ª, showing the flanges, with the full lines showing the uncompressed basal width of the tire. This causes the flanges to subject the basal ends of the members to strong lateral compression which in turn increases the firmness with which the inner members clamp the outer members to the rim for the purpose set forth. Making the basal ends of all the members 1 and 2 of less yielding material as hereinafter set forth, also tends in the same direction, namely, to increase the tightness of clamping of the outer members to an extent sufficient to make them do that full share of the driving work which they should do relatively to the inner members.

Of course the outer members 2—2 also play some part in supporting the load and absorbing shocks.

As a further improvement I have made the upper portions of both the outer and inner members, that are in side by side contact, of a firmer and less yielding compound than other parts of the tire, said upper portions, constituting the base of the tire, nevertheless still remaining elastically stretchable so that they can be forced over or otherwise received upon a tire rim which has normally a substantially greater diameter than the inside diameter of the base of the tire. In the drawings, the more closely cross-lined parts indicate said firmer, less yielding portions. This causes lessened movement and working of said parts on one another when the tire is in action and consequently reduces attrition and wear at the contacting faces of said parts which, of course, it is highly desirable to avoid.

As much as possible of the members 1—1 should consist of fully alive rubber for its cushioning effect. Therefore, I prefer that the lines of union between the firmer upper ends of said members and their lower fully alive portions should incline outwardly and downwardly from the region of the clamping means 6 towards the upper ends of the openings 3—3. Said lines of union need not fully reach the upper ends of said openings or may do so if preferred.

Some of the foregoing improvements may be used without others. Changes and modifications may be made in the practical embodiments of my present improvements which will, nevertheless, still be within the spirit of the foregoing description and within the meaning and spirit of the annexed claims and which as such are accordingly intended to be covered thereby.

What I claim is:

1. In a tire, the combination of spaced inner and outer members, a tread portion uniting the lower ends of said members, their upper portions being adapted to be in side by side contact with their free ends adapted to be contained in the flange space of a tire rim; said upper ends of the inner members being adapted to be clamped to the rim, and themselves being adapted to clamp the upper ends of the outer members thereto; said upper ends of the inner members being normally higher than the corresponding ends of the outer members so that when the tire is clamped on the rim said upper ends of the inner members will be more compressed than the corresponding ends of the outer members.

2. In a tire, the combination of spaced inner and outer members, a tread portion uniting the lower ends of said members, their upper portions being adapted to be in side by side contact with their free ends adapted to be contained in the flange space of a tire rim; said upper ends of the inner members being provided with clamping ledges and adapted to be clamped through same to the rim, and themselves being adapted to clamp the upper ends of the outer members thereto; the basal surface of said upper ends juxtaposed off the rim being transversely convex.

3. In a tire, the combination of spaced inner and outer members, a tread portion uniting the lower ends of said members, their upper portions being adapted to be in side by side contact with their free ends adapted to be contained in the flange space of a tire rim; said upper ends of the inner members being adapted to be clamped to the rim; and clamping means therefor comprising a separate clamping ring engaging the upper end of each inner member.

4. In a tire, the combination of spaced inner and outer members, a tread portion uniting the lower ends of said members, their upper portions being adapted to be in side by side contact with their free ends adapted to be contained in the flange space of a tire rim, said upper ends of the inner members being adapted to be clamped to the rim; and clamping means therefor comprising a separate clamping ring engaging the upper end of each inner member, said rings being in lateral juxtaposition when the tire is on the rim.

5. In a tire, the combination of spaced inner and outer members, a tread portion uniting the lower ends of said members, their upper portions being adapted to be in side by side contact with their free ends adapted to be contained in the flange space of a tire rim, said upper ends of the inner members being adapted to be clamped to the rim; and clamping means therefor comprising a separate clamping ring engaging the upper end of each inner member, said rings being made a part of said upper ends when the tire is molded.

6. In a tire, the combination of spaced inner and outer members, a tread portion uniting the lower ends of said members, their upper portions being adapted to be in side by side contact with their free ends adapted to be contained in the flange space of a tire rim, said upper ends of the inner members being adapted to be clamped to the rim; and clamping means therefor comprising a separate clamping ring engaging the upper end of each inner member, said rings toward their outer edges each having a flange portion directed towards the rim seated in corresponding recesses in the upper ends of the inner members.

7. In a tire, the combination of spaced inner and outer members, a tread portion uniting the lower ends of said members, their upper portions being adapted to be in side by side contact with their free ends adapted to be contained in the flange space of a tire rim, said upper ends of the inner members being adapted to be clamped to the rim; and clamping means therefor comprising a separate clamping ring engaging the upper end of each inner member, said rings toward their outer edges each having a flange portion directed towards the rim seated in corresponding recesses in the upper ends of the inner members, the inner edges of said rings coming together when the tire is on the rim.

8. In a tire, the combination of spaced inner and outer members, a tread portion uniting the lower ends of said members, the upper portions of said members being adapted to be demountably secured to a tire rim in side by side contact, all of said upper portions being elastically stretchable but firmer and less yielding than other parts of the tire so that there will be reduced movement thereof on one another at their contacting faces when the tire is in action.

9. In a tire, the combination of spaced inner and outer members united by a tread portion, said outer members being elbow-shaped in cross-section with the elbows directed laterally outwardly and with their limbs converging toward the tread and the base of the tire respectively, the basal portions of said inner and outer members being elastically stretchable but firmer and less yielding than other parts of the tire so that there will be reduced movement of said basal portions on one another at their adjoining faces.

10. In a tire, the combination with a tread and wall portions, of a base portion adapted to be secured to a flanged rim by the interior circumference of said base portion being smaller than the base of the rim, and the width of the base being greater than the width between the flanges of the rim, and an interiorly located clamping ring clamping said tire base against the base of said rim and against the inner sides of said rim flanges.

In testimony whereof, I have signed my name to this specification, this 5th day of May 1922.

MAX CYRUS OVERMAN.